United States Patent [19]

Arribart et al.

[11] Patent Number: 5,190,825
[45] Date of Patent: Mar. 2, 1993

[54] ADHESIVE LAYER USED IN THE MANUFACTURE OF LAMINATED GLAZINGS, METHOD OF MANUFACTURING AND LAMINATED GLAZINGS COMPRISING SUCH LAYER

[75] Inventors: Herve Arribart, Soisy Sous Montmorency; Pascal Chartier, Paris, both of France

[73] Assignee: Saint-Gobain Vitrage, Courbevoie, France

[21] Appl. No.: 781,642

[22] Filed: Oct. 25, 1991

Related U.S. Application Data

[63] Continuation of Ser. No. 207,550, Jun. 16, 1988, abandoned.

[30] Foreign Application Priority Data

Jun. 16, 1987 [FR] France ................ 87 08345

[51] Int. Cl.$^5$ .................. B33B 17/10; B33B 27/40
[52] U.S. Cl. ................... 428/412; 428/424.2; 428/424.4; 428/425.6; 428/441; 428/442; 428/501; 428/516; 428/518; 428/520
[58] Field of Search ............. 428/424.2, 424.4, 425.6, 428/441, 442, 412, 501, 516, 518, 520, 522

[56] References Cited

U.S. PATENT DOCUMENTS

| | | | |
|---|---|---|---|
| 2,999,056 | 9/1961 | Tanner | 204/154 |
| 3,090,664 | 5/1963 | Cline et al. | 8/115.5 |
| 3,115,418 | 12/1963 | Magat et al. | 117/47 |
| 3,188,288 | 6/1965 | Magat et al. | 117/62 |
| 3,252,880 | 5/1966 | Magat et al. | 204/154 |
| 3,327,022 | 6/1967 | Riou et al. | 260/879 |
| 3,328,194 | 6/1967 | Kasper | 428/345 |
| 3,433,724 | 3/1969 | Chapiro et al. | 204/159.17 |
| 3,488,268 | 1/1970 | Tanner | 522/120 |
| 3,616,364 | 10/1971 | D'Alelio | 522/144 |
| 3,661,618 | 5/1972 | Brookman et al. | 428/40 |
| 3,754,966 | 8/1973 | Newman et al. | 428/516 |
| 3,880,818 | 4/1975 | Shen et al. | 522/183 |
| 3,947,620 | 3/1976 | Plant et al. | 428/68 |
| 3,959,102 | 5/1976 | Wajs et al. | 522/129 |
| 4,018,939 | 4/1977 | Merrill et al. | 427/163 |
| 4,052,527 | 10/1977 | Pastor et al. | 428/520 |
| 4,065,624 | 12/1977 | Prucnal et al. | 428/522 |
| 4,070,259 | 1/1978 | DePoortere et al. | 522/103 |
| 4,098,918 | 7/1978 | DeMajistre | 428/511 |
| 4,108,840 | 8/1978 | Friedlander | 525/455 |
| 4,131,637 | 12/1978 | Bernstein et al. | 525/301 |
| 4,137,364 | 1/1979 | Ball et al. | 428/412 |
| 4,170,663 | 10/1979 | Hahn et al. | 428/522 |
| 4,206,025 | 6/1980 | Urancken et al. | 522/163 |
| 4,218,279 | 8/1980 | Green | 428/345 |
| 4,272,586 | 6/1981 | Ando et al. | 428/441 |
| 4,277,538 | 7/1981 | Beckmann et al. | 428/429 |
| 4,299,754 | 11/1981 | Shiomi et al. | 525/301 |
| 4,311,759 | 1/1982 | Glennor | 428/345 |
| 4,312,916 | 1/1982 | Kakumaru et al. | 428/345 |
| 4,317,862 | 3/1962 | Honda | 428/441 |
| 4,414,254 | 11/1983 | Iwata et al. | 528/522 |
| 4,511,627 | 4/1985 | Tanuma et al. | 428/522 |
| 4,552,604 | 11/1985 | Green | 428/345 |
| 4,559,382 | 12/1985 | Martens et al. | 525/296 |
| 4,600,627 | 7/1986 | Handa et al. | 428/441 |
| 4,632,877 | 12/1986 | Watanabe et al. | 428/409 |
| 4,654,262 | 3/1987 | Alonso | 428/345 |
| 4,714,655 | 12/1987 | Bordoloi et al. | 428/345 |
| 4,751,145 | 6/1988 | Sebastano et al. | 428/442 |
| 4,762,882 | 8/1988 | Okano et al. | 525/288 |
| 4,762,884 | 8/1988 | Goyert et al. | 525/455 |
| 4,781,978 | 11/1988 | Duan | 428/516 |
| 4,859,742 | 8/1989 | Pattein et al. | 525/455 |

FOREIGN PATENT DOCUMENTS

| | | |
|---|---|---|
| 0035130 | 9/1981 | European Pat. Off. . |
| 0077227 | 4/1983 | European Pat. Off. . |
| 0279722 | 8/1988 | European Pat. Off. . |
| 0344045 | 11/1989 | European Pat. Off. . |
| 2031706 | 2/1971 | Fed. Rep. of Germany . |
| 2025433 | 1/1980 | United Kingdom . |

*Primary Examiner*—Paul J. Thibodeau
*Assistant Examiner*—D. S. Nakarani
*Attorney, Agent, or Firm*—Oblon, Spivak, McClelland, Maier & Neustadt

[57] ABSTRACT

The invention relates to an adhesive plastic layer used in laminated glazings, in particular as an intermediate layer. The plastic layer contains, radiochemically grafted onto at least one of its surfaces, monomer and/or oligomers of an unsaturated monomer, such as acrylic acid or salts of said monomer.

7 Claims, No Drawings

ADHESIVE LAYER USED IN THE MANUFACTURE OF LAMINATED GLAZINGS, METHOD OF MANUFACTURING AND LAMINATED GLAZINGS COMPRISING SUCH LAYER

This application is a continuation of application Ser. No. 07/207,550, filed on Jun. 16, 1988, now abandoned.

BACKGROUND OF THE INVENTION

1. Field of the Invention

The present invention relates to the manufacture of laminated glazings in glass and/or plastic, for example large-sized laminated glazings, such as glazings for automobiles or buildings, and small-sized glazings for masks, screens, eyeglasses, etc. More particularly, the invention relates to a new adhesive layer used in the manufacture of such laminated glazings. Furthermore, it relates to laminated glazings containing said adhesive layer.

2. Background of the Prior Art

The use of a polyurethane layer, for example, as an adhesive layer in laminated glazings is well-known and is described in numerous patent publications. This layer can fulfill the sole function of adhesive. It can in addition play the role of an energy-absorber.

This adhesive layer can be used to assemble sheets of various glass and/or plastic substances.

Depending on the components to be assembled and the uses planned for the laminated glazings, it is desired to have greater or lesser adhesion between the components to be assembled and the inserted layer. When greater adhesion is desired, it is generally necessary to treat the components to be assembled using a primer, so as to increase the natural adhesion of the polyurethane layer with the glass or plastic sheets.

Finding a suitable primer is not easy and, when such is found, it can generally only be applied to a specific polyurethane layer.

Problems of adhesion can thus be posed for other intermediate layers for laminated glazings, in particular for polyvinyl chloride (PVC) or polyvinylbutyral (PVB) intermediate layers.

Thus, high optical quality transparent polyvinyl chloride could be used to advantage as an intermediate layer in laminated glazings because it has satisfactory energy-absorbing properties and its cost is reduced. However, it is generally not used because its adhesive properties are very weak or non-existent.

SUMMARY OF THE INVENTION

The invention proposes an adhesive layer which can be used in particular as an intermediate layer in the safety glazings described above, which have excellent properties of adhesion with the sheets of glass and/or plastic comprising the laminated glazings.

The layer in accordance with the invention is a layer of plastic selected in particular from among polyurethane, polyvinyl chloride or polyvinylbutyral, which contains, radiochemically grafted onto at least one of its surfaces, the surface or surfaces intended to be in contact with the other components of the laminated glazing, monomers and/or oligomers of an unsaturated monomer or salts of said monomer.

In particular, a suitable unsaturated monomer is an acrylic or a methacrylic monomers such as acrylic acid, methacrylic acid, maleic acid, fumaric acid, acrylamide, acrylonitrile, methacrylonitrile, silanes with an acrylic or methacrylic group, etc.

Very good results are obtained in particular using acrylic acid or methacryloxypropyltrimethoxysilane.

DETAILED DESCRIPTION OF THE PREFERRED EMBODIMENTS

The presence of monomers and/or oligomers of an unsaturated monomer such as acrylic acid or of salts of said acid at the surface of the plastic layer renders said surface very hydrophilic and its adhesion properties are thus improved.

One of the problems encountered in obtaining the plastic layer grafted with monomers or oligomers of, for example, acrylic acid or salts of said acid, is preventing the formation of an acrylic polymer, in particular an acrylic acid homopolymer at the surface of the plastic layer which would, at least partially, destroy the good properties of adhesion of said layer. The method of grafting in accordance with the invention which is described below resolves this problem.

The invention relates in particular to thermoplastic layers with energy-absorbing properties, in particular thermoplastic polyurethane, in PVC or in PVB. It can also be used with layers of polyurethane obtained by reactive castings at a high temperature, on the order of 100° to 140° C., of a mixture of a polyol component and an isocyanate component, which method gives branching reactions. Such layers are, for example, described in European Patent Publication 0 133 190.

The adhesive layers in accordance with the invention can be used as intermediate layers between two sheets of glass and/or plastic; their two surfaces are then generally grafted in accordance with the invention; when it is a matter of a polyurethane obtained by reactive casting as described above, they can also be used as an outer layer in an asymmetrical glazing, by possibly being treated at the surface so as to improve scratch and abrasion resistance. Of course, in this case, only the surface in contact with the substrate is grafted in accordance with the invention.

When the adhesive layer is polyurethane, it is generally formed from an isocyanate component selected from among aliphatic isocyanates, cycloaliphatic isocyanates and aliphatic-aromatic isocyanates, which are light-insensitive and can contain urea functions or even isocyanate biurets, and a polyol component comprising at least one polyol selected from among the polyetherpolyols or the polyesterpolyols with a molecular weight of between 450 and 2000, the polycaprolactones with a molecular weight of between 500 and 2000, the polycarbonatepolyols and polyesterpolycarbonatepolyols with a molecular weight of between 1000 and 2000 and the polybutadienes with a hydroxyl or carboxyl function, associated, where appropriate, with at least one short diol with molecular weight of between 50 and 200.

In particular, for example, as the isocyanate, aliphatic difunctional isocyanates can be used, such as 1-6-hexanediisocyanate, 2,2,4-trimethyl-1,6-hexanediisocyanate, 2,4-4-trimethyl-1,6-hexanediisocyanate, 1,3-bis (isocyanatomethyl) benzene, bis(4-isocyanatocyclohexyl)methane, bis-(3-methyl-4-isocyanatocyclohexyl)methane, 2,2-bis- (4-isocyanatocyclohexyl) propane, 3-isocyanatomethyl-3,5,5-trimethylcyclohexylisocyanate, p-phenylenediisocyanate and p-cyclohexyldiisocyanate.

As the polyols, polyols obtained by reaction of polyfunctional alcohols with aliphatic diacids or cyclic ethers for example are used. The polyfunctional alcohols are, for example, 1,2-ethanediol (ethylenegylcol), 1,2-propanediol, 1,3-propanediol, 1,2-butanediol, 1,4-butanediol, 2,2-dimethyl-1,3-propane-diol (neopentylglycol), 1,6-hexanediol, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, polyethyleneglycols, dipropyleneglycol, tripropyleneglycol, polypropyleneglycols or 2,2-bis (hydroxymethyl) 1-1-propanol (trimethylolethane), 2,2-bis (hydroxymethyl)-1-butanol (trimethylolpropane), 1,2,4-butanetriol, 1,2,6-hexanetriol, 2,2-bis (hydroxymethyl)-1,3-propanediol (pentaerythritol) and 1,2,3,4,5,6-hexanehexol (sorbitol), or cyclohexanedimethanol.

The aliphatic diacids are, for example, malonic acid, succinic acid, glutaric acid, adipic acid, suberic acid and sebacic acid.

The polyol component can, where appropriate, further contain a cross-linking agent with a functionality of greater than 2, such as a triol with a molecular weight of between 100 and 3000.

When the adhesive layer is an intermediate polyvinyl chloride layer (PVC), a suitable PVC is a high optical quality PVC, called crystal PVC.

The invention also relates to a method for the formation of a plastic layer having improved adhesion properties.

In accordance with the method, acrylic acid is grafted on at least one of the surfaces of the plastic layer by radiochemical grafting using electron bombardment. The irradiation of the surface layer of plastic, when for example polyurethane is used, causes particularly the rupture of the chains of the polyurethane and the formation of radicals, a part of which can thus react with the acrylic acid.

The radiochemical method preferably uses electron bombardment so as to limit the action of the radiation on the surface layer of plastic. It has, in effect, been noted that X-ray radiation which was too energetic altered the mechanical properties of the plastic layer, particularly in the case of polyurethane, and, moreover, caused very rapid homopolymerization of the unsaturated monomer, particularly of the acrylic acid.

A preferred method for the grafting consists of using low energy electronic radiation, whose penetration into the plastic layer is limited to approximately 100 to 150 $\mu$m.

In addition, in order to prevent overly rapid penetration of the unsaturated monomer, in particular of the acrylic acid, during its deposit onto the plastic layer, an aqueous solution is preferably used whose monomer content is less than 20% by weight and preferably less than 10% by weight.

The dilution of the unsaturated monomer in water also has the advantage of limiting the homopolymerization reaction of the monomer, in particular of the acrylic acid, during the irradiation, where said irradiation follows the deposit of the aqueous solution of the monomer onto the plastic layer.

The layer of plastic can be irradiated in advance, then placed in the presence of the aqueous solution of the unsaturated monomer.

The aqueous solution of the unsaturated monomer is preferably first deposited onto the plastic layer and the layer covered in this manner is subjected to low energy radiation, preferably low energy electronic radiation for the reasons indicated above.

When the plastic layer has been irradiated and essentially contains on its surface monomers and oligomers of the unsaturated monomer, for example acrylic acid, it can preferably be subjected to a further treatment with a base, such as sodium or potassium, so as to transform the acid groups into carboxylates, the hydrophilic character of which is more accentuated and which, consequently, have even more improved properties of adhesion.

Other advantages and characteristics of the invention will become apparent from the following description of examples of plastic layers in accordance with the invention.

EXAMPLE 1

An aqueous solution with 5% acrylic acid, containing a tensio-active agent in an amount of 0.5% by weight, was deposited onto a sheet of polyether-urethane formed from a polytetramethylene glycol with a molecular weight of approximately 3200 (60% by weight) and diisocyanatodicyclohexylmethane (40%. by weight). In this manner approximately 0.5 g of solution was deposited per 100 $cm^2$ of surface to be treated.

The sheet of polyurethane was then subjected to electronic radiation using 170 kV and 1.8 mA. The dose received was approximately 1 Mrad.

The dose is the quantity of energy transferred to the material which is expressed in units of energy per units of mass of the irradiated material (1 rad = $6.25.10^3$ eV/g).

The same method was used on the other surface of the sheet.

After irradiation, the sheet is soaked in a 1% sodium solution so as to transform the acid groups into sodium carboxylates.

The sheet was used as an intermediate layer between two sheets of glass: the glazing finally obtained had high glass polyurethane adhesion which was a great improvement as compared to the adhesion without the treatment, as shown in Reference Example 1.

The adhesion values were measured using the peeling test, which consisted of exerting, on a 1 cm wide strip of the polyurethane sheet, traction which was perpendicular to the surface of the glazing, with a traction speed of 5 cm per minute and at temperature of 20° C. The average traction force was noted. In this case it was approximately 10 daN.

REFERENCE EXAMPLE 1

The polyurethane sheet of Example 1, not treated in accordance with the invention with acrylic acid, was assembled, without using a primer, with two sheets of glass.

The glass-polyurethane adhesion measured was very low, less than 0.1 daN.

REFERENCE EXAMPLE 2

The polyurethane sheet of Example 1, not treated in accordance with the invention with acrylic acid, was treated with a primer, in this case $\gamma$—aminopropyltriethoxysilane, in a known manner.

The measured adhesion of approximately 15 daN was comparable to that obtained with the polyurethane treated in accordance with Example 1.

EXAMPLE 2

The sheet of polyurethane grafted and treated in accordance with Example 1 was used as an intermediate layer in a glass-polyurethane-polycarbonate glazing.

The polycarbonate-polyurethane adhesion measured was high.

EXAMPLE 3

The sheet of polyurethane grafted and treated in accordance with Example 1 was used as an intermediate layer in a laminated glazing formed of two sheets of methyl polymethylacrylate (PMMA) and said intermediate layer.

The PMMA-PU adhesion value measured was higher than with the untreated polyurethane sheet.

EXAMPLE 4

A glazing was prepared in the same manner as in Example 1.

An aqueous solution with 10% acrylic acid was deposited onto a sheet of polyurethane at a rate of 0.5 g of solution per 100 $cm^2$ of surface to be treated.

The sheet of polyurethane was then submitted to electronic radiation at 170 kV and 1.7 mA in the presence of oxygen so as to inhibit the homopolymerization reaction of the acrylic acid. The dose absorbed was 1 Mrad.

Used as an intermediate layer between two sheets of glass, the treated sheet of polyurethane demonstrated high adhesion properties.

EXAMPLE 5

An aqueous solution with 5% acrylic acid was deposited at a rate of 0.5 g of solution per 100 $cm^2$ of surface to be treated, onto a sheet of polyester-urethane formed from a polycaprolactonediol and diisocyanatodicyclohexylmethane.

The sheet was submitted to the same treatment as in Example 1, then assembled with the two sheets of glass.

The glass-polyurethane adhesion was improved as compared to the value obtained in accordance with Reference Example 3.

REFERENCE EXAMPLE 1

The sheet of polyurethane of Example 5 untreated in accordance with the invention was used for the assembly of two sheets of glass.

The glass-PU adhesion was lower than with the radiochemically treated sheet of polyurethane.

EXAMPLE 6

A layer of polyurethane obtained by reactive casting, as described in European Patent Publication 0 133 090 from a mixture of a polyol component formed of poly- tetramethyleneglycol with a molecular weight of 1000, polycaprolactonetriol 1,4-butanediol and an isocyanate component formed of 3-isocyanatomethyl-3,5,5-trimethyl-cyclohexylisocyanate (IPDI) having urea functions, was treated as in Example 1 on only one of its surfaces.

It was combined with a sheet of glass, with the grafted surface facing the glass. The adhesion measured was improved as compared to the adhesion obtained without treatment.

The treatment in accordance with the invention of a polyurethane layer gives comparable adhesions to those obtained with adhesion primers, and, where appropriate, enables them not to be used.

EXAMPLE 7

A sheet of crystal polyvinyl chloride (PVC) was treated in the same manner as in Example 1, by the deposit of an aqueous acrylic acid solution followed by irradiation using electronic radiation.

The treated sheet of PVC was used as an intermediate layer between two sheets of glass.

The measured adhesion of the glass-treated PVC was 0.8 daN, while it was zero for an untreated PVC.

EXAMPLE 8

A sheet of crystal PVC was used as in Example 7, but with a deposit of an aqueous solution with 2% methacryloxypropyltrimethoxysilane followed by irradiation using electronic radiation. The dose received by each surface was approximately 8 Mrad. The treated sheet of PVC was used as an intermediate layer between two sheets of glass. The measured adhesion of the glass-treated PVC was 0.5 daN.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A transparent laminate, comprising a layer of plastic selected from the group consisting of polyurethane, polyvinylbutyral and polyvinylchloride having at least two major surfaces, wherein at least one of monomers or oligomers of an unsaturated monomer or salts of said monomer are radiochemically grafted on at least one of the major surfaces, which is in contact with a sheet selected from the group consisting of glass, polycarbonate and polymethylmethacrylate, to improve the adhesion between the layer of plastic with said sheet.

2. The transparent laminate of claim 1, wherein the unsaturated monomer is selected from the group consisting of acrylic monomers, methacrylic monomers and mixtures thereof.

3. The transparent laminate of claim 3, wherein the unsaturated monomer is selected from the group consisting of acrylic acid, methacrylic acid, maleic acid, fumaric acid, acrylamide, acrylonitrile, methacrylonitrile, silanes with an acrylic or methacrylic group and mixtures thereof.

4. The transparent laminate of claim 2, wherein the unsaturated monomer is selected from the group consisting of acrylic acid and methacryloxypropyltrimethoxysilane.

5. The transparent laminate of claim 3, wherein the unsaturated monomer is acrylic acid.

6. The transparent laminate of claim 1, wherein said plastic layer is a polyurethane layer.

7. The transparent laminate of claim 6, wherein said polyurethane layer obtained by reactive casting.

* * * * *